Nov. 1, 1927.
O. C. REEVES
WEIGHING SCALE
Original Filed May 31, 1924
1,647,307
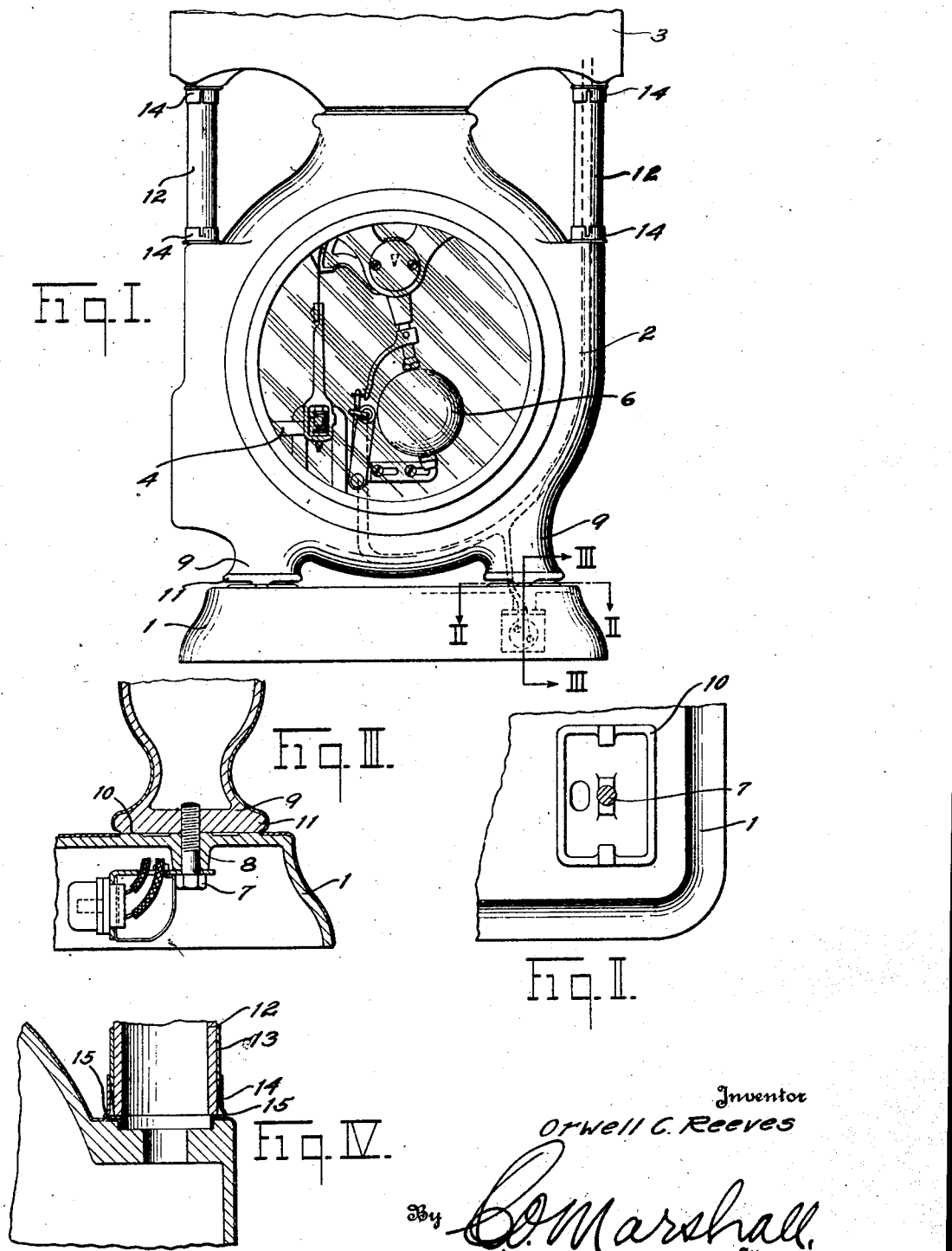

Patented Nov. 1, 1927.

1,647,307

UNITED STATES PATENT OFFICE.

ORWELL C. REEVES, OF TOLEDO, OHIO, ASSIGNOR TO TOLEDO SCALE COMPANY, OF TOLEDO, OHIO, A CORPORATION OF NEW JERSEY.

WEIGHING SCALE.

Original application filed May 31, 1924, Serial No. 717,033, and in Canada July 11, 1924. Divided and this application filed January 24, 1927. Serial No. 163,003.

This is a division of my application for improvements in weighing scales, Serial Number 717,033, filed May 31, 1924, and relates particularly to scales of the so-called cylinder type, and one of its principal objects is to improve the appearance of joints between various elements of the scale frame when such elements are finished in porcelain enamel or other vitreous coating.

Another object is to increase the sturdiness of scales of this type.

Another object is to facilitate the manufacturing and assembling operations in building scales of this kind.

And still another object is to improve the appearance of scales of this class.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a fragmentary rear elevational view of a weighing scale embodying my invention;

Figure II is a sectional plan view taken substantially on the line II—II of Figure I;

Figure III is an enlarged fragmentary sectional view taken substantially on the line III—III of Figure I;

Figure IV is an enlarged fragmentary sectional detail view through a portion of the scale housing.

Referring to the drawings in detail, the base 1, upright housing 2, chart housing 3, lever 4, a commodity-receiver (not shown), and the load-counterbalancing pendulum 6 are of the same general construction as that illustrated and described in United States patent to Hapgood, No. 1,166,128, patented Dec. 28, 1915.

The framework, housings and the exposed working parts of the scale of the present invention are, however, intended to be finished in porcelain enamel or with other vitreous coating, and some of the features of this invention are particularly valuable when incorporated in scales so finished. The upright housing 2 is secured upon the rear end of the base 1 by means of cap screws 7 which pass upwardly through bosses 8 formed upon the lower side of the top of the base and are threaded into feet 9 on the upright housing 2. The portions of the base 1 and the feet 9 which are in engagement when the base and housing are assembled are provided with pads 10 which may be of any desired shape and which extend from the upper and lower surfaces of the base and foot respectively so that they may be readily machined off. The bottom of the foot 9 has an outwardly extending rounded edge 11 which projects beyond the pads 10 so that from the ordinary position of observation the joint between the base and the foot is concealed and only the rounded edge 11 and the adjacent portion of the base are visible. The rounded edge and the adjacent portion of the base are of such contour that they may be readily coated with porcelain enamel, and, as the pads which form the actual contacting portions of the housing and base project from the surfaces of the base and housing, the porcelain enamel may be readily wiped off from the pads before the base is fired and they may even be machined after the remainder of the part has been porcelain enameled. Interposed between the upright housing 2 and the chart housing 3 are tubular members 12, one of which serves as a conduit for electric wiring, while the other encases the intermediate portion of a rack bar (not shown) which operates the indicating mechanism. These tubes are preferably also finished in porcelain enamel, as shown at 13, in Figure IV, and in order to provide an attractive joint between the tubes and the parts to which they are connected the connections are made by means of ferrules 14 which are preferably nickel plated. The ferrules 14 may, if desired, be split so that they resiliently clamp about the ends of the tubes and automatically conform to the size of the tubes, even though there be slight variations in size and in thickness of the porcelain enamel coating. The ferrules are provided with outwardly extending beads 15 which overlie the portions of the housing adjacent the openings in which the ends of the ferrules are inserted and thus, like the rounded edges 11 on the feet 9, serve to hide the joint and conceal such slight imperfections in the porcelain enamel coating as may occur around the opening.

The embodiment of my invention herein shown and described is to be regarded as illustrative only, and it is to be understood that the invention is susceptible to variation, modification and change within the spirit and scope of the subjoined claims.

Having described my invention, I claim:

1. In a weighing scale, in combination, a base, an upright housing supported thereon, a vitreous coating on said base and said housing, and means comprising uncoated raised portions on said base to prevent the vitreous coated portions of said base and housing from engaging each other.

2. In a weighing scale, in combination, a base, an upright housing supported thereon, a vitreous coating on said base and said housing, and means comprising uncoated raised portions on said base and on said housing to prevent the vitreous coated portions of said base and housing from engaging each other.

3. In a weighing scale, in combination, a base, an upright housing supported thereon, a vitreous coating on said base and said housing, and means comprising uncoated raised portions on said base to prevent the vitreous coated portions of said base and housing from engaging each other, the portion of said upright housing immediately above said raised portion being swelled outwardly to conceal the joint between said housing and said base.

4. In a weighing scale, in combination, a base, an upright housing supported thereon, a chart housing surmounting said upright housing, and a vitreous coating on said base and said housings, said base and said housings having uncoated raised portions at their junctures to prevent the vitreous coated portions from engaging each other.

5. In a weighing scale, in combination, a housing, a tubular member joining a portion of said housing, a vitreous coating on said housing and said tubular member, and means including a ferrule surrounding said tubular member at its junction with the housing to conceal the adjoining portions of said members.

6. In a weighing scale, in combination, a housing, a tubular member joining a portion of said housing, a vitreous coating on said housing and said tubular member, and means including a ferrule surrounding the tubular member at its junction with the housing to conceal the adjoining portions of said members, the portion of said ferrule adjacent its juncture with said housing being swelled outwardly to conceal such juncture.

ORWELL C. REEVES.